United States Patent [19]

Livorsi et al.

[11] Patent Number: 4,508,315

[45] Date of Patent: Apr. 2, 1985

[54] BIDIRECTIONAL VALVE SEAL

[75] Inventors: Carl F. Livorsi, Warwick; Joseph A. Wucik, Jr.; Philip J. Dorrian, both of Westerly; Lawrence F. Struzik, Weekapaug, all of R.I.

[73] Assignee: Edison International Inc., Rolling Meadows, Ill.

[21] Appl. No.: 519,617

[22] Filed: Aug. 2, 1983

Related U.S. Application Data

[63] Continuation of Ser. No. 267,956, May 28, 1981, abandoned.

[51] Int. Cl.³ .............................................. F16K 25/00
[52] U.S. Cl. .................... 251/173; 251/174; 251/307; 251/317
[58] Field of Search ............... 251/173, 174, 306, 307, 251/317

[56] References Cited

U.S. PATENT DOCUMENTS

| | | | |
|---|---|---|---|
| 2,209,526 | 7/1940 | Kingman | 267/166 X |
| 2,515,629 | 7/1950 | Chambers | 267/167 |
| 2,587,810 | 3/1952 | Beyer | 267/167 X |
| 3,121,553 | 2/1964 | Grove | 251/174 X |
| 3,356,336 | 12/1967 | Maenaka | 251/306 |
| 3,642,248 | 2/1972 | Benware | 251/174 X |
| 3,804,396 | 4/1974 | Seybold | 267/166 |
| 3,814,380 | 6/1974 | Kormos | 251/307 |
| 4,005,848 | 2/1975 | Eggleston | 251/307 X |
| 4,174,557 | 11/1979 | Goto | 251/307 X |
| 4,192,484 | 3/1980 | Scaramucci | 251/173 |

Primary Examiner—Harold W. Weakley
Attorney, Agent, or Firm—Jon Carl Gealow; James A. Gabala; John T. Halloran

[57] ABSTRACT

A valve seal for a butterfly valve comprises a U-shaped annular seating member disposed in an annular slot in the valve body and a retaining ring for holding the seating member in place. The seating member cross-section comprises two legs and a bight portion connecting them. A first one of the legs is captured between the retaining ring and valve body to hold the seating member in the slot and enable limited rotational movement of the seating member. A radially inwardly projecting extension on the bight terminates in an annular sealing surface that cooperates with the valve disc. The seating member divides the slot into first and second axial sides in fluid pressure communication with the valve chamber. The seal also comprises an annular open-helical back-up member disposed in an annular cavity formed in the slot by the legs and bight portion of the seating member. The annular cavity is in fluid pressure communication with the second axial side of the slot. The back-up member resists cross-sectional compression and creates an expansive reaction force in a direction perpendicular to a cross-sectional compressive force. This arrangement provides effective sealing for system pressure from either side of the seal. The retaining ring is held to the valve body by attachment means comprising a plurality of radially extending threaded holes through the valve body and a plurality of conical blind holes in the retaining ring, each aligned with a threaded hole. A screw with a conical end is accepted in each threaded hole and cooperates with the blind holes to urge the retaining ring axially toward the valve body.

2 Claims, 7 Drawing Figures

BIDIRECTIONAL VALVE SEAL

This application is a continuation of application Ser. No. 267,956, filed May 28, 1981, now abandoned.

BACKGROUND OF THE INVENTION

This invention relates to a valve seal, and more particularly to a bidirectional valve seal in which pressure in the fluid line makes sealing more effective.

The prior art shows many types of seals for butterfly valves. Perhaps the simplest seal uses a solid resilient member. In one form, the resilient member is captured in the valve body and has an annular surface that seals against the valve disc. U.S. Pat. Nos. 3,591,133 to Miles et al; 3,608,861 to Helman et al; 3,997,142 to Broadway; 4,114,856 to MacAfee et al; and 4,210,313 to Chester; and British Pat. No. 1,203,029 to Jarrett show such sealing arrangements. A variation of that approach mounts the solid resilient member to the disc and an annular surface on the resilient member seals against the valve body. U.S. Pat. Nos. 3,658,292 to Takigawa and 4,154,426 to Santy et al disclose duch seals.

Another seal uses a sealing member similar to those discussed above, except that the member has an annular cavity rather than being solid. Within the annular cavity is another separate resilient member. The outer member may be of a material relatively impervious to the media carried through the valve and the inner member provides the resistance to deformation that optimizes sealing. U.S. Pat. No. 3,563,510 to Priese shows that type of seal, in which a rubber or elastomeric O-ring or a helically wound, round-wire spring, comprises the inner member. Another variation of that approach uses a flat-wire spring as the resilient inner member held between two legs of the outer member clamped in the valve body. The two legs of the outer member have a spacing member between them that provides a bearing surface to resist radially outward movement of the inner member when the disc closes. That type of seal is incorporated in valves sold by the Duriron Company, Inc. of Cookeville, Tenn. under the name "Big Max".

A third type of seal uses a sealing member that "floats" in a cavity in the valve body and has a backing member in the cavity to urge the floating member radially inwardly against the valve disc. U.S. Pat. Nos. 3,282,558 to Swain; 3,497,178 to Priese; 3,642,248 to Benware; 3,986,699 to Wucik, Jr. et al; 4,088,299 to Maciulaitis et al; 4,113,268 to Simmons et al; 4,130,285 to Whittaker; 4,165,859 to Maciulaitis et al; and 4,194,749 to Bonafous disclose seals that use that approach. Those patents disclose various devices as the backing member. For example, in one embodiment of Benware's seal, an O-ring deforms in cross-section when system pressure enters the cavity and wedges against the sealing member to urge it radially inwardly against the valve disc. It is known that the seal shown in Benware has also used a flat-wire spring backing member. The flat-wire spring provides resistance to the radially outward urging of the floating member by reacting against the bottom of the cavity, thus holding the floating member against the disc. The seal shown in the Bonafous patent functions in a similar manner, but uses a round-wire instead of a flat-wire spring. The Benware patent, and other of those patents such as the Whittaker patent, also show a garter spring as the backing member. The garter spring creates hoop compression in the sealing member to urge it against the valve disc and thus generally creates a sealing action different from that created by a backing member that is resilient in cross-section.

A final type of seal uses a sealing member having one leg held in the valve body. The sealing member and the valve body define a cavity. Generally, although not always, the cavity has a backing member in it. U.S. Pat. Nos. 2,988,320 to Kent; 3,260,496 to Borcherdt; 3,734,457 to Roos; 4,005,848 to Eggleston; and 4,044,994 to Priese, and the "Series 206 Valves" made by Royal Industries of Santa Ana, Calif., show embodiments of that approach. The Kent U.S. Pat. No. 2,988,320 and Priese U.S. Pat. No. 4,044,994 patents show a round-wire garter spring that creates hoop compression in the disc to urge the sealing member radially inwardly. The Roos patent uses flat metal hoops for the same purpose. The Eggleston patent uses a round-wire garter spring in the cavity as a fulcrum about which the sealing member can bend under system pressure. In that way, the sealing member is urged against the valve disc.

The typical structure for holding annular seals, like those used for butterfly valves, in place includes a retaining ring held against a valve body. The seal is disposed in an annular slot formed by the valve body and retaining ring. The valve body includes flanges for connecting the valve to flanges on the fluid line.

In the prior art, the retaining ring is held against the valve body by bolts disposed axially through the valve body and retaining ring. An example of such an arrangement is shown in the Broadway patent. With that configuration, the heads of the bolts must be recessed into the axial face of the retaining ring because the flanges on the fluid line bear directly against the axial face of the retaining ring.

SUMMARY OF THE INVENTION

The present invention comprises a valve seal for a valve having an annular valve body defining a valve chamber, a valve closure member movable in the valve chamber between open aand closed positions and an annular retaining ring secured to the valve body and defining therewith an annular slot. The valve seal of the present invention comprises an annular valve seating member generally U-shaped in cross-section. One of the legs of the U-shaped cross-section comprises anchor means which is captured between the valve body and retaining ring to hold the valve seating member in the slot for limited rotation about the anchor means relative to the cross-section of the slot. The legs of the U-shaped cross-section cooperate with the sides of the slot to limit rotation of the seating member. The valve seating member divides the slot into first and second axial sides sealed from each other by the anchor means but each in said fluid pressure communication with the valve chamber. The bight portion of the U-shaped cross-section comprises an annular sealing surface for cooperating with the valve closure member. The annular seating member forms in the slot an annular cavity in substantial radial alignment with the sealing surface and in fluid pressure communication with the second axial side of the slot. The annular seating member compresses the annular cavity when the seating member rotates toward the second axial side and when pressure is higher by a predetermined amount on the first axial side than on the second axial side. The valve seal also comprises an annular, cross-sectionally compressible back-up member disposed in the cavity.

Another aspect of the present invention comprises attachment means for holding the retaining ring to the valve body. The attachment means comprises a radially extending threaded hole through the body and a conical blind hole in the retaining ring aligned with the radially extending threaded hole. A screw with a conical end is accepted in the radially extending threaded hole in the body for cooperation with the blind hole to urge the retaining ring axially toward the valve body.

DETAILED DESCRIPTION OF EMBODIMENTS OF THE INVENTION

Figure 1:
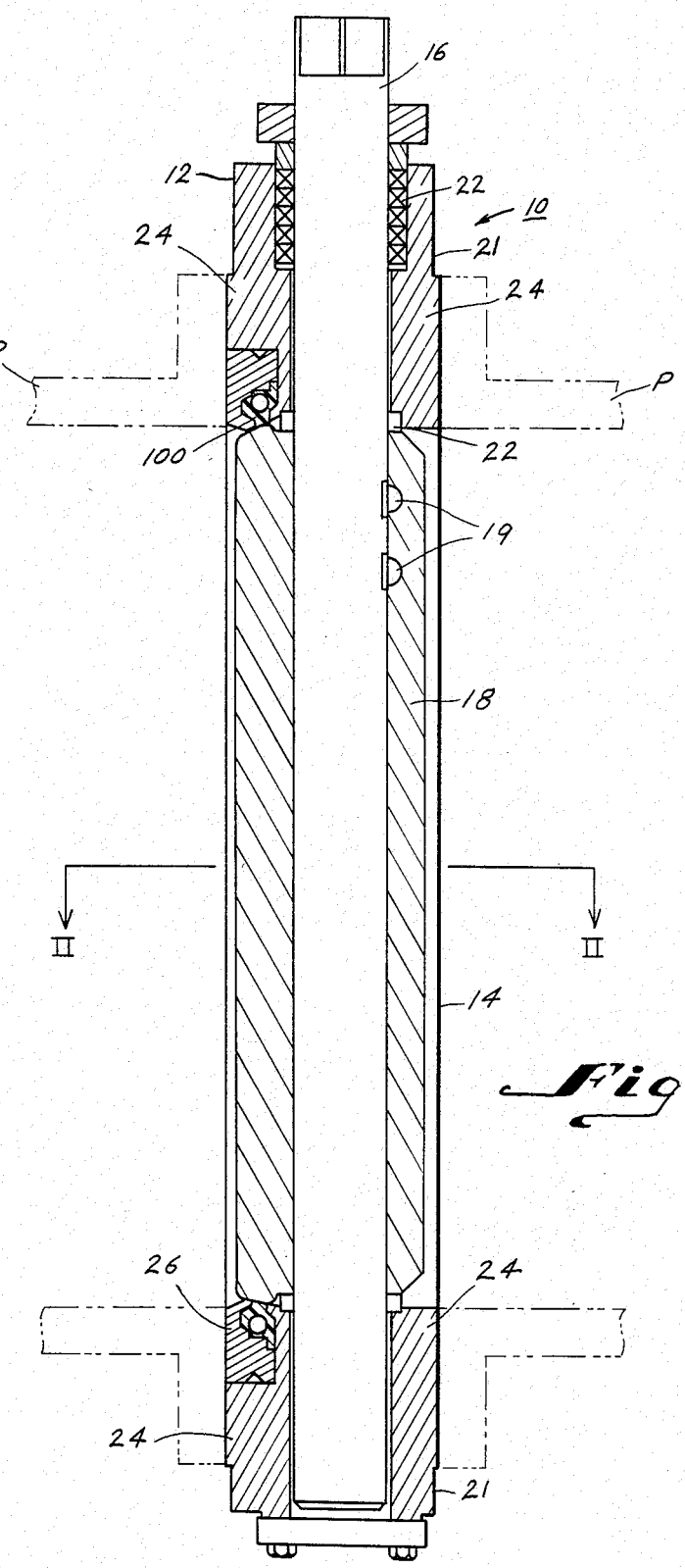
FIG. 1 is a sectional view of a butterfly valve, taken axially along the valve shaft, incorporating the present invention.
Figure 2:
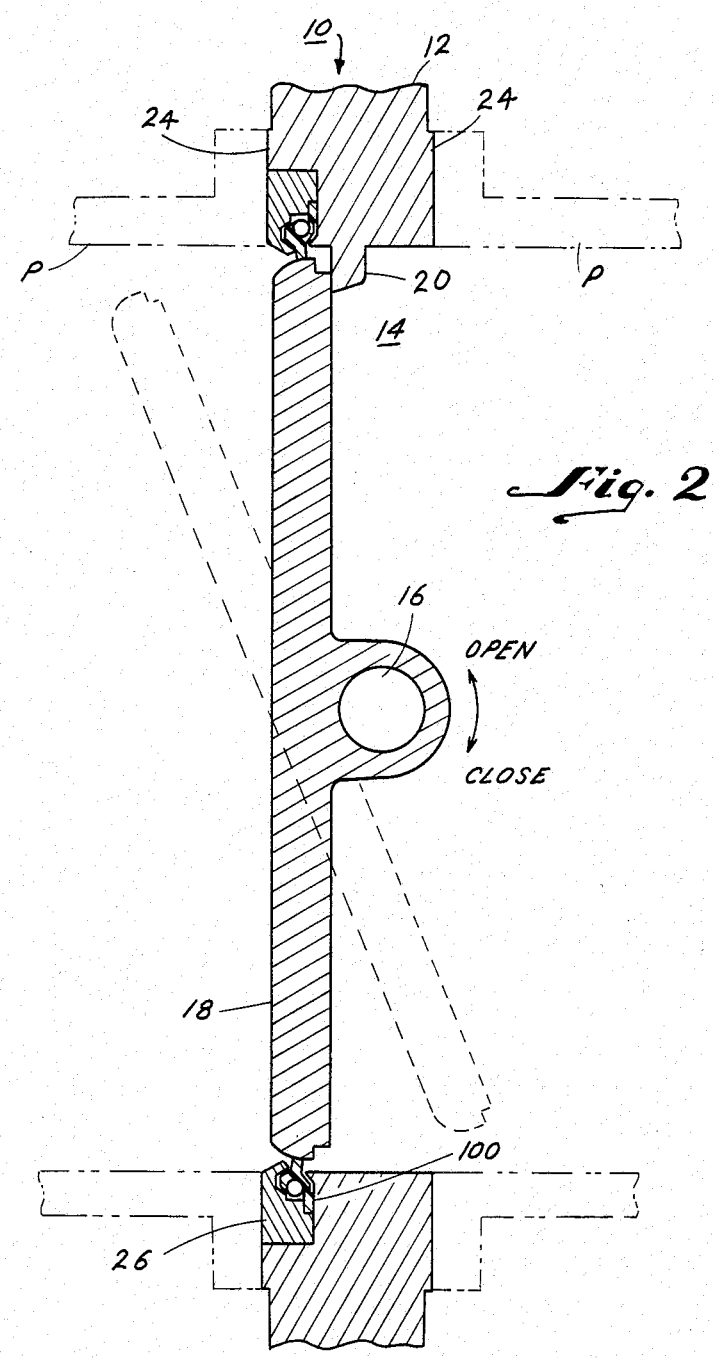
FIG. 2 is a sectional view of the butterfly valve taken along lines II—II in FIG. 1.

FIGS. 1 and 2 show a butterfly valve 10. The butterfly valve 10 includes a valve body 12 that defines a valve chamber 14. The valve body 12 has a shaft 16 mounted therein for rotation. A disc 18 is mounted to the shaft 16 by pins 19 or other suitable fasteners. The disc 18 functions as a valve closure member that opens and closes by rotation of the shaft 16, as is illustrated in FIG. 2.

FIG. 2 illustrates the double-offset used in such valves. First the plane of the disc 18 is offset axially from the center line of the valve shaft 16. Second, the valve shaft 16 is offset very slightly (up or down as seen in FIG. 2) from the center line of the valve chamber 14. The first offset moves the valve disc 18 clear of its seal for all open positions. But for the first offset, the portions of the seal where the valve disc mounts to the valve body would be subject to rubbing and excessive wear. The second offset causes the final portion of the travel of the valve disc 18, as it approaches the closed position, to be axial of the valve chamber 14. This double-offset geometry is familiar to those skilled in the art and is particularly advantageous with the seal of the present invention. A stop 20 limits rotation and defines the closed position of the valve disc 18. The stop 20 is cast into the valve body 12 and then machined to provide precise positioning of the valve disc 18 in its closed position.

As FIG. 1 shows, the shaft 16 is mounted in bosses 21, and seals and packing 22 prevent leakage from the valve chamber 14 around the shaft 16. The bosses 21 form an integral part of the valve body 12. The valve body also includes circumferentially extending mounting faces 24. The mounting faces 24 include holes therethrough (not shown) for mounting the valve body to the flanges of pipes P that form the fluid line.

A retaining ring 26 fits into an annular groove in one face of the valve body 12. The retaining ring 26 holds in place a valve seal 100 that forms one aspect of the present invention. The valve seal 100 cooperates with the valve disc 18 when the valve disc is closed to prevent flow through the fluid line.

Figure 3:
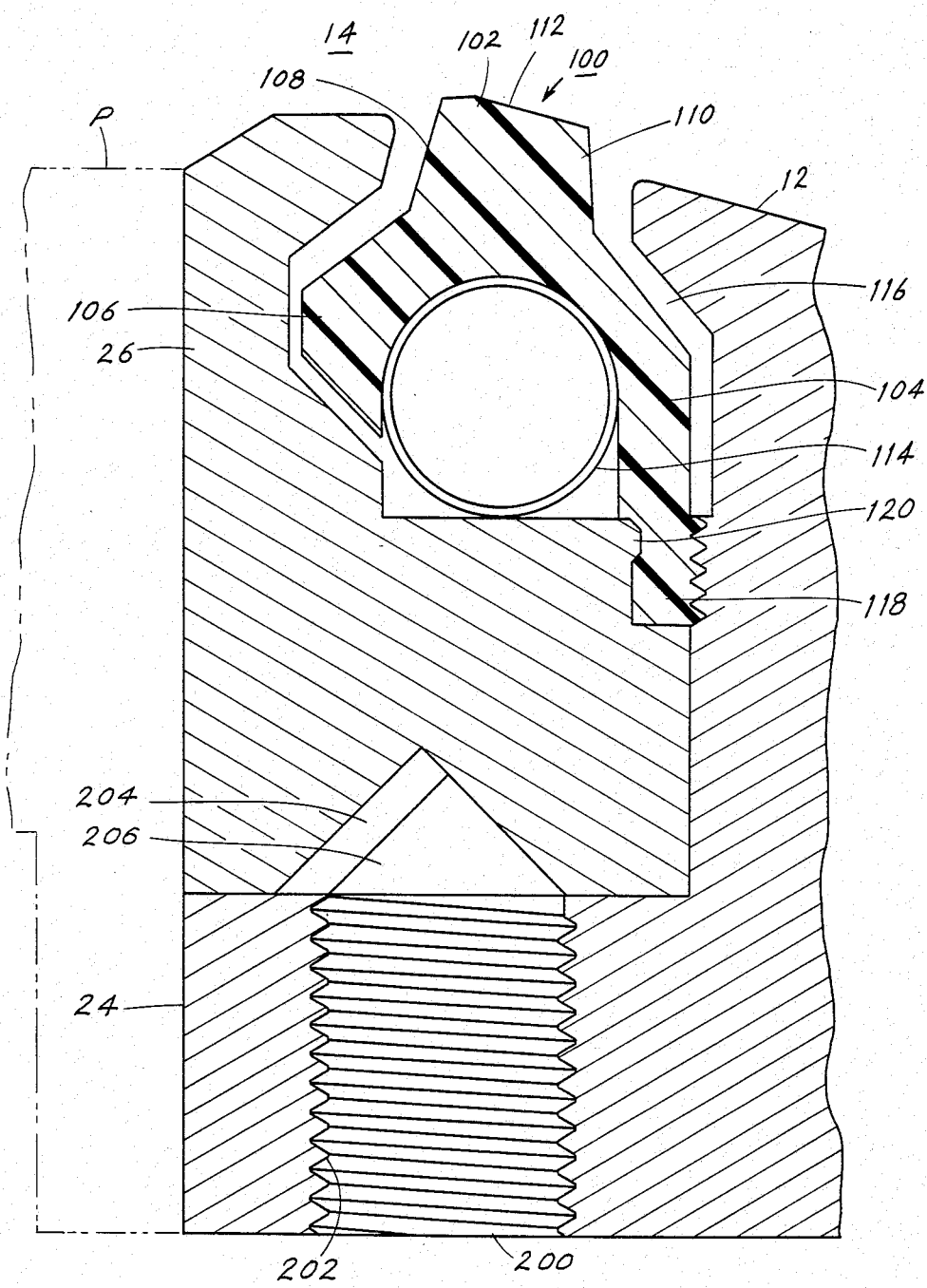
FIG. 3 is a detailed view of the valve seal of the present invention when the valve is open.

FIG. 3 shows the relation of the valve body 12, the retaining ring 26 and the various attachment means. FIG. 3 is a sectional view taken radially at a circumferential location away from the bosses 21.

Figure 4:
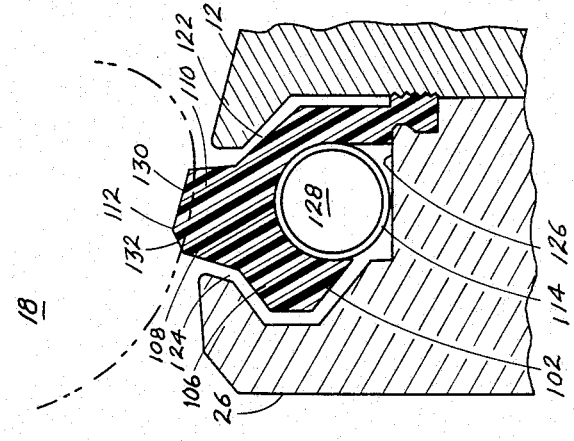
FIG. 4 demonstrates the inteference fit between the valve disc, shown in dotted lines, and the seal of the present invention, shown in the position it assumes when the valve is open.

The valve seal 100 comprises an annular valve seating member 102 made of a relatively hard, yet flexible, material such as TEFLON synthetic resin polymer. The seating member 102 is U-shaped with two legs 104, 106 and a bight portion 108 connecting them. The bight portion 108 includes an extension 110 that projects radially inwardly. The extension 110 terminates in an annular sealing surface 112 that cooperates with the outer surface of the valve disc 18. As the dotted lines in FIG. 4 show, the valve seating member 102 forms an interference fit with the valve disc 18 when the valve disc is in its closed position. The valve seal 100 also comprises an annular, cross-sectionally compressible backup member 114. The valve body 12 and retaining ring 26 form an annular slot 116 in which the valve seal 100 fits.

One leg 104 of the valve seating member 102 forms an anchor means 118 that is captured between the valve body 12 and the retaining ring 26 to hold the valve seating member 102 in the slot 116. The valve body 12 has serrations on the axial face where the leg 104 is captured between the valve body 12 and the retaining ring 26. The axial distance between the valve body 12 and the retaining ring 26 where the leg is captured is less than the axial thickness of the leg 104. The retaining ring 26 includes a lip 120 that further decreases the axial distance between the valve body 12 and the retaining ring 26. When the retaining ring 26 is pressed axially against the valve body 12, the lip 120 causes cold flow of the leg 104 radially outwardly of the lip 120 and aids the cold flow of the leg 104 into the serrations. The seating member is thus held securely in the slot 116 and the leg 104 acts as a secondary seal to ensure that there is no flow across the seal 100.

The principal force clamping the retaining ring 26 axially against the valve body 12 is provided by axial compression occuring when the valve body 12 is clamped between the pipes P. However, it is necessary to hold the valve body 12 and the retaining ring 26 in the proper relative positions with the seal 100 in its proper place prior to insertion of the valve in the fluid line. The retaining ring attachment means performs that task.

Pre-assembling positioning is accomplished by set screws 200, the axes of which are disposed radially. A plurality of threaded radially extending holes 202 spaced equally around the circumference of the valve body 12 accept the set screws 200. The retaining ring 26 includes a like plurality of blind conical holes 204 aligned with the threaded radial holes 202. The set screws 200 have conical ends 206 that cooperate with the inclined sides of the blind holes 204 to urge the retaining ring 26 axially to the right as viewed in FIG. 3 as the set screws 200 are screwed radially into the holes 204. This retaining ring attachment means, instead of the axial holes through the retaining ring 26 used in the prior art, enables easier preliminary assembly of the valve body 12 and retaining ring 26. And by eliminating the axial holes through the retaining ring 26, it removes a potential source of leakage. Although this arrangement can include any number of such attachment means, four has been found to yield acceptable results.

FIGS. 3 and 4 show the seal 100 in the position it assumes when the valve is open. The annular slot 116 formed by the valve body 12 and the retaining ring 26 is generally similar in cross-sectional shape to the shape of the annular seating member 102. The annular slot 116 narrows axially to a circumferentially extending opening. The radial extension 110 of the bight 108 projects through that opening into the valve chamber 14. The seating member 102 divides the slot 116 into a first axial side 122 and a second axial side 124, both of which are in fluid communication with the valve chamber 14.

The slot 116 includes a radially inwardly facing shoulder 126 which, with the legs 104 and 106 and the bight portion 108, defines an annular cavity 128. The annular cavity 128 is substantially aligned radially with the annular sealing surface 112. The radially inwardly facing walls of the cavity 128 formed by the seating member 102 are circular in cross-section and conform to the outer surface of the back-up member 114. The cavity 128 is in fluid pressure communication with the second axial side 124 of the slot. The annular sealing surface 112 has a face 130 at one axial side of the sealing surface 112.

Figure 5:
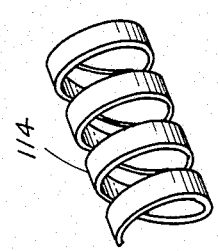
FIG. 5 is a detail of an open-helical, flat-wire spring back-up member used in the preferred embodiment of the present invention.

FIG. 5 shows in detail a portion of the preferred cross-sectionally compressible back-up member 114. The back-up member 114 comprises a helically wound metallic "flat wire" spring element. Stainless steel or Hasteloy is the preferred material because of their resistance to deterioration by a wide variety of media. The pitch of the spring is greater than the width of the flat wire so that there are spaces between adjacent sections of wire. Such an "open-helical" configuration enables fluid to flow freely around and through the back-up member 114 and thus transmit fluid pressure therethrough. When the cross-section of the back-up member 114 is compressed in one direction, it will cause an expansive reaction force perpendicular to the compressive force. A "flat-wire" spring, that is, one formed of a strip of spring material rectangular in cross-section, more readily than other cross-sections transforms such a compressive force into an expansive reaction force perpendicular thereto.

Figure 7:
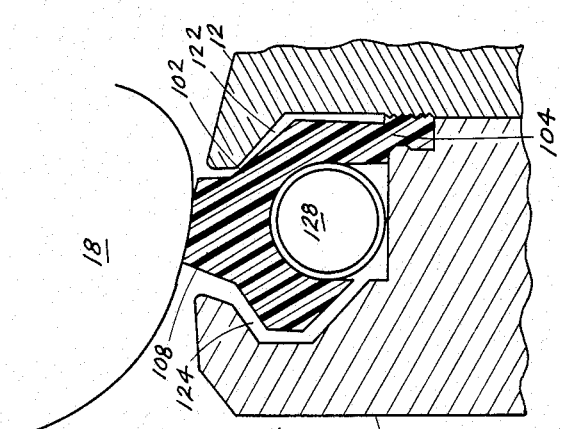
FIG. 7 is a detail of the relative positions of the valve parts and seal of the present invention when the valve disc is closed and system pressure is from left to right as viewed in FIG. 7.
Figure 6:
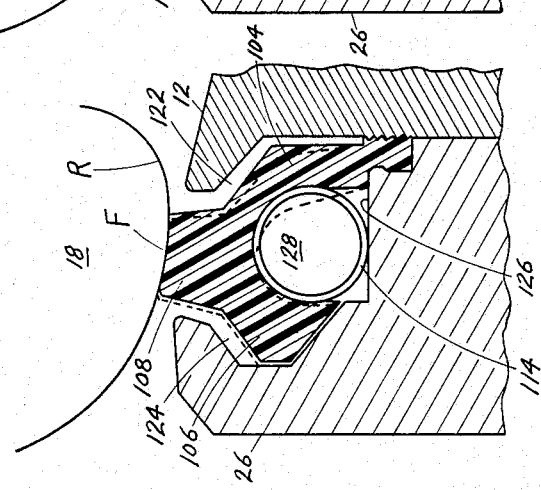
FIG. 6 is a detail showing the relative positions of the valve parts and seal of the present invention when the valve disc is closed and, in solid lines, when there is no system pressure and, in dotted lines, when system pressure is from right to left in FIG. 6.

The operation of the valve seal of the present invention is best seen by reference to FIGS. 6 and 7. FIG. 6 show, in solid lines, the position of the valve seal when the valve disc 18 is closed but no system pressure is present. A comparison of FIG. 3 of 4 with FIG. 6 shows that the seating member 102 moved slightly axially by rotation about the leg 104 as the disc 18 closed. The outer peripheral surface of the disc 18 contacts the annular sealing surface 112 and the seating member 102 rotates toward the second axial side 124 of the slot 116. The annular cavity 128 and the cross-section of the back-up member 114 is slightly compressed in a generally radial direction relative to the valve body. The back-up member 114 resists that compression and creates a generally radial reaction force against the shoulder 126 and the inside of the bight portion 108 that forces the valve seating member 102 toward the disc 18. The interference fit between the annular sealing surface 112 and the disc surface 18, in addition to the generally radial force exerted by the back-up member 114 in reaction to its compression, form the static component of the sealing force that holds the annular sealing surface 112 against the disc 18.

As FIG. 2 illustrates, a certain circumferential portion of the periphery of the valve disc 18 approaches the annular seating member 102 from left to right as viewed in FIG. 6. The double offset described above, the radius R and the flat sealing face F formed on the valve disc 18 and a face 132 on the annular sealing surface 112 combine to cause the disc 18 to approach the seating member 102 at an advantageous angle which aids in seating the face F of the valve disc against the face 130 of the annular sealing surface 112 (see FIG. 6) around the entire periphery of the valve disc 18. Ideally, when the valve disc has closed completely, the annular seating member 102 has rotated just far enough to allow a very small passageway between the leg 106 and the second axial side 124 of the annular slot 116 to provide pressure communication between the valve chamber 14 and the annular cavity 128.

Fluid pressure adds a dynamic component to the sealing force regardless of which side of the disc is pressurized when the valve is closed. FIG. 6 shows in dotted lines the position assumed by the annular seating member 102 and the valve disc 18 when the valve is pressurized from the right side as shown in FIG. 6. As the pressure on the right side of the disc 18 builds, manufacturing tolerances and wear that inevitably leave clearance between the valve shaft 18 and the bearings and packing 22 (see FIG. 1), and deflection of the disc 18 because of the pressure against it, allow axial movement to the left of the disc 18. The annular seating member 102 rotates to the left with the axial movement of the valve disc 18 until the leg 106 contacts the wall on the second axial side of the annular slot 116. The back-up member 114 resists that rotation and thus urges the annular sealing surface 112 and the valve disc sealing face F together.

If the pressure is high enough, it will also push on the surface of the leg 104 facing the first axial side 122 of the slot 116 and axially compress the back-up member 114. The dotted line position of the leg 104 as shown in FIG. 6 is exaggerated to illustrate this aspect of the operation of the valve seal. In any event, as the leg 104 continues to move generally axially under the influence of the pressure in the valve chamber 14 and the first axial side 122, the axial dimension of the annular cavity 128 is reduced. The back-up member 114 creates a generally radial reaction force that acts between the annular shoulder 126 and the annular seating member 102 to force the annular sealing surface 112 radially inwardly against the valve disc 18.

FIG. 7 shows the position of the annular seating member 102 and the valve disc when the valve is pressurized from left to right. Pressure forces the valve disc 18 to the right because of the clearances and deflection already mentioned. The annular seating member 102 rotates to the right with the disc 18. Because the disc 18 rotated the seating member 102 to the left upon closing, the counterrotation caused by pressurization from the left acts against that original rotation. The counterrotation of the annular seating member 102 in effect wedges the annular sealing surface 112 against the sealing face F of the valve disc 18. The counterrotation also exposes the annular cavity 128 to system pressure by opening the passageway at the second axial side 124 of the slot 116. The system pressure thus urges further counterrotation of the annular seating member 102 and also creates a generally radially inward force on the interior of the annular cavity 128 that urges together the sealing face F of the valve disc 18 and the annular sealing surface 112.

Thus, the valve seal of the present invention provides a static sealing component that preloads the seal in the absence of system pressure and a dynamic component regardless of the direction in which system pressure acts on the valve disc. Known prior art valve seals are believed to perform less effectively under a system pressure in one direction than they perform for a system pressure in the other direction. One of the reasons, it is believed, is because the known prior art seals do not allow for the inevitable axial movement of the valve disc under pressure. The present invention, however, performs very effectively regardless of the direction of system pressure.

As FIG. 7 illustrates, the size of the passageway at the second side 124 of the slot 116 without system pressure is not critical. The axial movement of the disc when system pressure acts to the right will tend to open the passageway because the annular seating member 102 rotates under those conditions. The open-helical, flat-wire structure of the back-up member 114 has been found to be the most advantageous configuration. For example, although a round-wire spring would work, it has been found that each coil of the spring provides insufficient bearing surface between the TEFLON annular seating member and the spring and the TEFLON cold-flows between the coils. A solid back-up member that deforms in cross-section, such as an O-ring, can also be used but is the least advantageous choice because it will not allow system pressure to enter the entire annular cavity 128 when pressurization is from left to right (see FIG. 7).

Although certain specific embodiments of the present invention and modifications thereto have been described, those skilled in the art will recognize other modifications that can be made within the spirit of the invention. For example, the present invention may be used with other types of valves and is not limited to use with a butterfly valve like that shown herein. Thus, it is intended that the above description be illustrative only of the preferred embodiments of the present invention, the scope of which is defined solely by the appended claims.

We claim:

1. A valve seal for a valve having an annular valve body which defines an axially extending valve chamber, a valve closure member which is movable in the valve chamber between open and closed positions, and an annular retaining ring which is secured to said valve body and which defines therewith an annular slot having a circumferential inwardly-facing axially-extending shoulder, the valve seal comprising:

an annular fluoroplastic valve seating member having a generally U-shaped cross-section defining generally radially outwardly extending first and second legs which are connected by a generally inwardly-facing axially-extending bight portion of circular cross-section, said bight portion including a radially disposed inwardly facing annular sealing surface for sealing cooperation with the valve closure member in the form of an interference fit;

anchor means, extending radially outward from said first leg, for flexibly and rotatably anchoring said seating member between the valve body and the retaining ring and in the annular slot, said seating member having an axial cross-section relative to the axial cross-section of the slot so as to divide the slot into first and second axial sides each in fluid pressure communication with the valve chamber, whereby said seating member is free to rotate about said anchor means relative to the axial limits of said slot, said legs and bight portion of said valve seating member defining an open annular generally circular circumferential groove which is bounded generally axially by said first and second legs and generally radially inwardly by said bight portion, said annular groove being open generally radially outwardly to the shoulder in the slot and in flow communication with said first axial side of said valve chamber, whereby when said valve is closed fluid pressure on said first axial side in excess of the fluid pressure on said second axial side urges said sealing surface into engagement with said valve closure member; and a plurality of generally circular spaced apart resilient elastically deformable elements which are connected together in the form of an open helix whose ends are connected together so as to form a circle and whose circumference is generally equal to the circumference of said groove such that it neither compresses said seating member inwardly nor applies an outwardly directed force to said shoulder, said elements being disposed within said groove in substantial radial alignment with said sealing surface, each of said resilient elements having a sufficiently large circumference so as to have peripheral sectors which simultaneously bear against said first leg and said second leg and said bight portion and said shouder, each of said resilient elements being formed from a coil of flat wire having a generally rectangular cross-section and being disposed within said groove with the longer side of said rectangular cross-section bearing against the interior surfaces of said groove, whereby that sector of any one resilient element which bears against said bight portion of said seating member resists outward displacement of said seating member, urges said sealing surface against the closure member, when said valve is closed, and when displaced outwardly produces an expansive reaction force in adjacent resilient elements which is directed generally inwardly towards said seating member.

2. The valve seal recited in claim 1, wherein each resilient elastically deformable element is formed of metal and wherein said valve seating member is formed of a synthetic resin polymer that exhibits a cold flow property.

* * * * *